United States Patent Office 3,403,135
Patented Sept. 24, 1968

3,403,135
ANIONIC POLYMERIZATION OF LACTAMS WITH N,N' - DIPHENYL - 1,3 - DIAZA - 2,4 - CYCLOBUTANEDIONE AS PROMOTER
George J. Schmitt, Madison, and Herbert K. Reimschuessel, Morristown, N.J., assignors to Allied Chemical Corporation, New York, N.Y., a corporation of New York
No Drawing. Filed Jan. 5, 1966, Ser. No. 518,786
6 Claims. (Cl. 260—78)

ABSTRACT OF THE DISCLOSURE

N,N'-diphenyl-1,3-diaza-2,4-cyclobutanedione is used as a promoter in the anionic polymerization of lactams to form solid, linear polyamides of high molecular weight.

---

Many processes have been proposed in the past for the preparation of solid polyamides of lactams such as epsilon-caprolactam. These processes have been based upon either the hydrolytic polymerization of the lactam in the presence of various acidic and basic catalysts or the anionic polymerization of these lactams, i.e., polymerization under anhydrous conditions in the presence of an alkali or alkaline earth metal compound which can be regarded as forming a metal salt with the lactam.

A disadvantage of these prior art processes is the necessity of conducting the process at relatively high temperatures; e.g., for epsilon-caprolactam, temperatures in excess of the polymer melting point of 215°–225° C. are necessary in order to obtain satisfactory rate and degree of polymerization. An undersirable feature in the use of such high temperatures is that the extent of polymerization decreases as the temperature of the reaction mixture is increased. For instance, if epsilon-caprolactam is polymerized at temperatures in excess of 215° C., appreciable quantities of epsilon-caprolactam are not converted to polymer, whereas below this temperature the formation of poly-epsilon-caprolactam is more highly favored. When high polymerization temperatures are used, it is frequently necessary to resort to extensive purification procedures to remove undesirable monomeric units present in the polymer.

A further disadvantage of the prior art processes is that the polyamides produced thereby have at best only moderate molecular weights corresponding to reduced viscosity of about 3.5 dl./g. in 0.5% solution in meta-cresol at 25° C., or roughly 100,000 weight average molecular weight.

In addition, in those instances where it was desirable to transform poly-epsilon-caprolactam into molded shapes, it was usual to heat said lactam to a temperature in excess of its melting point to prepare the desired fabricated shapes by extrusion or injection techniques. However, the poly-epsilon-caprolactam melt is extremely viscous, transfers heat slowly, and shrinks on cooling to leave voids. Consequently, such melt is not usable without special techniques for the preparation of large shaped articles. Moreover, the above-cited polyamides possess a tendency to discolor in air at elevated temperatures, about 270° C., commonly employed in said molding operations. Such discoloration or darkening has been attributed to oxidative attack upon the primary amino end group found in these polyamides.

It has been recently disclosed that the use of various promoters or cocatalysts permits anionic polymerization of lactams at temperatures below the polymer melting points. Some suitable catalysts and particular promoters are set forth for example in United States Patents 3,017,391 of Jan. 16, 1962 and 3,018,273 of Jan. 23, 1962, both to Butler, Hedrick and Mottus.

We have now discovered that N,N'-diphenyl-1,3-diaza-2,4-cyclobutanedione can be used as a promoter to effect rapid anionic polymerization of lactams to high molecular weight polyamides at temperatures which can be, but need not necessarily be, below the polymer melting point.

The cocatalyst promoter can be prepared in known manner such as disclosed by J. S. Blair and G. E. P. Smith, Jr., in The Journal of The American Chemical Society, 56, 907 (1934) at page 909, whereby phenyl isocyanate is mixed with an equal quantity of pyridine and allowed to stand overnight. Crystals of N,N'-diphenyl-1,3-diaza-2,4-cyclobutanedione appear almost immediately. The product can be recrystallized from benzene or carbon tetrachloride.

Although the exact mechanism of the reaction is unknown, it is believed that the reaction proceeds according to the sequence shown by the equations below, where caprolactam is shown as the lactam species for purposes of illustration:

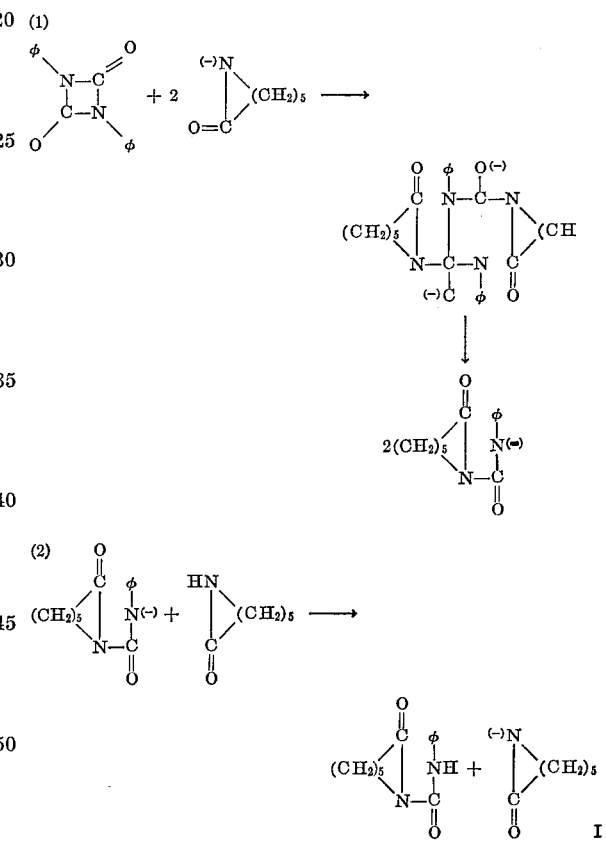

Polymerization then proceeds in known manner by a nucleophilic attack of a caprolactam anion on the carbonyl of the allophanic acid-type derivative designated above as I.

The promoter of the present invention must interact with an anionic catalyst and lactam to initiate the polymerization process. The ratio of equivalents of metal in the anionic catalyst to equivalents of promoter supplied can vary widely. In general, the polymer molecular weight will tend to be higher and the polymerization rate will be lower at the lower metal to promoter ratios and at lower promoter concentrations. Suitable ratios of equivalents of metal in the catalyst to equivalents of promoter are in the range from about 0.1:1 to about 20:1. Suitable promoter concentrations are in the range of 0.01 mole to 10 moles per 100 moles of the lactam being polymerized.

The lactams employed as at least the major polymerizable ingredient in accordance with this invention are epsilon-caprolactam and lactams with larger rings, e.g., 8–13 membered rings, especially omega-enantholactam, omega-caprylolactam and omega-lauroylactam; and homologs thereof. Anionic polymerization of the lactams with 6-membered and smaller rings differs in character, as is known, from anionic polymerization of lactams having 7-membered and larger rings. However, lactams with six and fewer atoms in the lactam ring can be used in minor proportions in forming copolymers with the above lactams, suitable examples being azetidine-2-ones such as 4,4-dimethylazetidine-2-one; 2-pyrrolidone; and 2-piperidone. Moreover, together with epsilon-caprolactam or larger ring lactam, a dilactam can be used to form a crosslinked polymer; and mixtures of lactams having 7-membered or larger lactam rings can be used to form polymers including crosslinked polymers in accordance with this invention.

Polymerization temperatures which can be employed in the present invention range from the melting point of the lactam monomer to the decomposition temperature of the resulting polymer with the preferred maximum temperature being less than the polymer melting point. To minimize content of low molecular weight materials, e.g., monomers, and to realize good rates, the polymerization of caprolactam is carried out in a temperature range of about 130° to 215° C. Particularly good results in terms of rate and yield are obtainable by polymerizing caprolactam and lactams with larger rings, e.g., 8–13 membered rings, within the range of 140°–180° C.

It is necessary that the polymerization process disclosed herein be conducted under substantially anhydrous, non-acidic conditions. Those compounds which are capable of functioning as proton donors, viz., acids stronger than the lactam acting as an acid, are to be excluded from the reaction mixture (or neutralized) inasmuch as acidic compounds decompose equivalent proportions of the metal salts of lactams in the reaction mixture by replacing the metallic cation moiety of said species with a proton. Furthermore, under the process conditions disclosed herein, the presence of a proton-donating species such as water may function to hydrolize the lactam to carboxylic acids. The quantity of water and/or proton-donating species should be kept preferably not above about 50 p.p.m.

The polymerization process is preferably conducted by adding N,N'-diphenyl-1,3-diaza-2,4-cyclobutanedione to a reaction mixture containing a metal salt of the lactam, and the lactam; but a reverse procedure can be utilized if desired, i.e., the promoter can be added to the lactam, and the alkali or alkaline earth metal or salt-forming compound thereof can be added thereafter. Alternatively, if desired, it is possible to add the promoter simultaneously with the alkali or alkaline earth metal anionic catalyst to the lactam.

The metal salt of the lactam is preferably prepared in situ immediately prior to its utilization in the polymerization process to minimize risk of contamination. However, if desired a mixture of the lactam and the metal salt of the lactam may be prepared in advance and stored for periods of a month or longer if the temperature is controlled so as to prevent polymerization.

By utilization of our promoter in conjunction with an alkali or alkaline earth metal catalyst in accordance with this invention, high rate of lactam polymerization results as well as a high degree of conversion to polymer at temperatures considerably below the melting point of the polymer produced. For instance, in preparing polycaproamide which melts at 215°–220° C., it has been found that excellent results are obtained with polymerization temperatures of 140°–180° C. By the present invention it is possible to obtain polymeric products in which at least 95% of the monomer has been converted to polymer. Such degree of monomer conversion is highly desirable in that removal of residual monomer from the polymer obtained is unnecessary.

Polyamides can be prepared by the process of the present invention having molecular weights encompassing and appreciably exceeding those usually obtained by the conventional polymerization processes which do not employ anionic catalysts. High molecular weight materials produced by the present invention possess greater tensile strength and toughness, especially at elevated temperatures, than polyamides of much lower molecular weight.

The polymerization of relatively fluid monomer to solid polymer in the present process allows polymerizing lactams directly in molds, including molds of intricate design, to form solid shaped articles. The resulting articles are free of voids when any bubbles initially present are allowed to escape. Centrifugal and rotational casting methods, similar to those used for vinyl plastisols, can be used very conveniently.

A further advantage is that various additives including fillers such as sand; pigments such as carbon black; blowing agents such as oxazides; plasticizers; stabilizers; and reinforcing agents such as fibers of glass, metal and organic material can be readily added to the monomer to be converted to polymer by the present process. Such operations provide uniform distribution of the additive throughout the resulting polymer.

The following specific examples are given to further illustrate the invention and the best mode contemplated by us of carrying it out, but the invention is not to be understood as limited to all details described therein. The reduced viscosities were measured at 25° C. at concentrations of about 0.5 gram of polymer per 100 milliliters of solution, the units accordingly being deciliters per gram.

Example 1

A cocatalyst solution was prepared by dissolving 1.18 grams of N,N'-diphenyl-1,3-diaza-2,4-cyclobutanedione in 30 grams of anhydrous epsilon-caprolactam at 95° C. maintaining a nitrogen atmosphere. Twenty-two grams of epsilon-caprolactam were placed into a polymerization tube that was immersed in an oil bath at 95° C. With good stirring were added first 2.65 milliequivalents of butyl lithium and then 8 milliliters of the cocatalyst solution. The mole ratio of caprolactam:catalyst:cocatalyst in the resulting reaction mixture was about 100:1:0.5. The tube was then immersed in an oil bath, the temperature of which was maintained at 170° C. The reaction mass became solid within 2.5 minutes and separated from the wall of the tube after about 5 minutes. The resultant polymeric material had a reduced viscosity of 1.68 and an extractables content of 1.94%.

Example 2

1.33 milliequivalents of lithium butyl was admixed with 26 grams of epsilon-caprolactam at 95° C. and 4 milliliters of cocatalyst solution, prepared as in Example 1, was added (mole ratio caprolactam:catalyst:cocatalyst 200:1:0.5). The reactants were polymerized at 170° C., and the mass became solid in 4.5 minutes. The polymer separated from the wall of the tube in 9.0 minutes. The polymer product had a reduced viscosity of 2.83 and an extractables content of 1.75%.

Example 3

0.66 milliequivalent of lithium butyl was admixed with 28 grams of epsilon-caprolactam at 95° C. and 2 ml. of cocatalyst solution, prepared as in Example 1, was added (mole ratio caprolactam:catalyst:cocatalyst 400:1:0.5). The tube was immersed in an oil bath at 170° C. and the polymer solidified in 12.0 minutes. The polymer separated from the sides of the tube after 34 minutes. The reduced viscosity of the polymer was 4.36 and the extractables content was 1.81%.

Example 4

92 milligrams sodium metal were reacted with 168 grams of epsilon-caprolactam held at 95° C. Twelve milliliters of the cocatalyst solution, prepared as in Example 1, were added (mole ratio caprolactam:catalyst:

cocatalyst 400:1:0.5). The tube was immersed in an oil bath at 170° C. The polymer became solid after 17 minutes and it separated from the wall of the tube after 37 minutes. The reduced viscosity of the polymer was 5.17 and the extractables content was 2.2%.

It will be apparent that many modifications and variations may be effected without departing from the scope of the novel concepts of the present invention and the illustrative details disclosed are not to be construed as imposing undue limitations on the invention.

We claim:

1. In a process for polymerizing a lactam having at least seven atoms in the lactam ring under anionic polymerization conditions by heating said lactam in the presence of an anionic polymerization catalyst the improvement of adding N,N'-diphenyl-1,3-diaza-2,4-cyclobutanedione as a polymerization promoter to the reaction mixture and maintaining said reaction mixture at a temperature ranging from the melting point of the lactam to the decomposition point of the resulting polymer.

2. A process as claimed in claim 1, wherein the lactam polymerized comprises at least one member of the group consisting of epsilon-caprolactam, omega-enantholactam, omega-caprylolactam, and omega-lauroylactam.

3. A process as claimed in claim 2, wherein the lactam polymerized is epsilon-caprolactam.

4. A process as claimed in claim 1, wherein the polymerization is carried out at a temperature below the melting point of the resulting polymer.

5. A process for the anionic polymerization of epsilon-caprolactam comprising forming a reaction mixture containing epsilon-caprolactam, an alkali metal salt of epsilon-caprolactam as anionic catalyst, and N,N'-diphenyl-1,3-diaza-2,4-cyclobutanedione, and maintaining said reaction mixture at a temperature of about 130° to 215° C. until solid polymer is formed in said reaction mixture.

6. A process as claimed in claim 5, wherein about 0.1 to 20 equivalents of said alkali metal are present for each mole of N,N'-diphenyl-1,3-diaza-2,4-cyclobutanedione and about 0.01 to 10 moles of N,N'-diphenyl-1,3-diaza-2,4-cyclobutanedione are present for each 100 moles of epsilon-caprolactam.

References Cited

UNITED STATES PATENTS

| | | | |
|---|---|---|---|
| 3,015,652 | 1/1962 | Schnell et al. | 260—78 |
| 3,086,962 | 4/1963 | Mottus et al. | 260—78 |
| 3,207,729 | 9/1965 | Giberson | 260—78 |
| 3,216,977 | 11/1965 | Brouns | 260—78 |
| 3,251,799 | 5/1966 | Pietrusza et al. | 260—78 |
| 3,342,784 | 9/1967 | Gehm et al. | 260—78 |

WILLIAM H. SHORT, *Primary Examiner.*

HAROLD D. ANDERSON, *Assistant Examiner.*